(12) United States Patent
Lee et al.

(10) Patent No.: US 9,521,285 B1
(45) Date of Patent: Dec. 13, 2016

(54) DETACHABLE SCANNING AND SUPPORTING MODULE OF 3D PRINTER

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yang-Teh Lee, New Taipei (TW); Jia-Yi Juang, New Taipei (TW); Jen-Hsiang Liu, New Taipei (TW); Chi-Chieh Wu, New Taipei (TW); Yi-Min Chiu, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 0 days.

(21) Appl. No.: 14/807,142

(22) Filed: Jul. 23, 2015

(30) Foreign Application Priority Data

Jun. 1, 2015 (CN) .......................... 2015 1 0292866

(51) Int. Cl.
*G06F 3/12* (2006.01)
*G06K 15/10* (2006.01)
(Continued)

(52) U.S. Cl.
CPC ...... *H04N 1/00827* (2013.01); *H04N 1/00541* (2013.01); *H04N 1/00559* (2013.01); (Continued)

(58) Field of Classification Search
CPC .. B29C 67/00; B29C 67/0088; B29C 67/0066; B29C 67/0051; B29C 67/0055; B29C 67/0029; B05D 1/265; B05C 1/02; G06K 15/1809; H04N 13/02; H04N 2201/0081; H04N 2201/0422; H04N 2201/0448; B33Y 30/00; B33Y 50/02; B29K 2101/01
See application file for complete search history.

(56) References Cited

U.S. PATENT DOCUMENTS 8,285,130 B1 * 10/2012 Lai .......................... G03B 15/06
396/5
9,358,728 B1 * 6/2016 Chang ..................... B29C 31/04
(Continued)

*Primary Examiner* — Cheukfan Lee
(74) *Attorney, Agent, or Firm* — Chun-Ming Shih; HDLS IPR Services

(57) ABSTRACT

A 3D printer includes a machine body, a printing platform, a scanning and driving module, and a scanning and supporting module. The machine body has a bottom plate. The printing platform and the scanning and driving module are disposed on the bottom plate. The printing platform includes a slide track and a movable printing substrate. The scanning and driving module and the slide track are staggeredly disposed such that the scanning and driving module and the slide track do not interfere with the movement of the printing substrate. The scanning and supporting module is detachably combined with the scanning and driving module and is driven by the scanning and driving module.

14 Claims, 8 Drawing Sheets

(51) Int. Cl.
*H04N 1/00* (2006.01)
*H04N 1/04* (2006.01)
*B33Y 30/00* (2015.01)
*B33Y 40/00* (2015.01)

(52) U.S. Cl.
CPC ............... *H04N 1/04* (2013.01); *B33Y 30/00* (2014.12); *B33Y 40/00* (2014.12); *H04N 2201/0446* (2013.01)

(56) References Cited

U.S. PATENT DOCUMENTS

| | | | |
|---|---|---|---|
| 9,364,995 B2* | 6/2016 | Roberts, IV | B29C 67/0088 |
| 2001/0019340 A1* | 9/2001 | Kubo | B41J 2/01 |
| | | | 347/1 |
| 2006/0147188 A1* | 7/2006 | Weng | F16M 11/046 |
| | | | 396/5 |
| 2007/0035539 A1* | 2/2007 | Matsumura | G06T 7/0067 |
| | | | 345/419 |
| 2014/0265034 A1* | 9/2014 | Dudley | B29C 67/0062 |
| | | | 264/401 |
| 2014/0271964 A1* | 9/2014 | Roberts, IV | B29C 67/0055 |
| | | | 425/150 |
| 2014/0374949 A1* | 12/2014 | Toh | B29C 67/0088 |
| | | | 264/241 |
| 2015/0054918 A1* | 2/2015 | Lee | H04N 13/0221 |
| | | | 348/46 |
| 2015/0057785 A1* | 2/2015 | Liu | G05B 19/4099 |
| | | | 700/119 |
| 2015/0110912 A1* | 4/2015 | Okamura | B29C 67/0055 |
| | | | 425/162 |
| 2015/0170009 A1* | 6/2015 | Cudak | G06K 15/00 |
| | | | 358/1.15 |
| 2015/0298395 A1* | 10/2015 | Yeh | B29C 67/0088 |
| | | | 700/120 |
| 2015/0319418 A1* | 11/2015 | Yahav | G03B 15/00 |
| | | | 348/50 |
| 2016/0052210 A1* | 2/2016 | Jeng | H04N 1/02895 |
| | | | 700/98 |
| 2016/0176108 A1* | 6/2016 | Tadin | B29C 67/0055 |
| | | | 425/375 |

* cited by examiner

DETACHABLE SCANNING AND SUPPORTING MODULE OF 3D PRINTER

BACKGROUND OF THE INVENTION

Technical Filed

This technical field relates to a 3D printer, and more specifically, to a detachable scanning and supporting module of a 3D printer.

BACKGROUND 3D printing is a technique of rapid molding, it is also named as additive manufacturing (AM), or layer molding. 3D printing is based on digital model file, then adherable materials, such as metallic powders or plastics, can be accumulated layer by layer based on the digital model file so as to form an object, and thus a 3D structure with any shapes can be formed.

In 3D printing, in general, the materials in the feed tube is squeezed out and accumulated based on the order of computer graphic software, and thus a 3D structure is formed. Further, in order to mold a 3D structure rapidly, a 3D information of the object can be obtained by a 3D scanning device in advance, and then the 3D information is read by the order of computer graphic software, so as to perform 3D printing.

However, in present 3D printers, 3D scanning and 3D printing are two individual modules. A 3D printer, which can perform both 3D scanning and 3D printing, usually has a larger inner space and has a larger size. However, the size is large and it occupies a large space, which should be improved.

Accordingly, in order to solve the above problem, the inventor proposes the disclosure so as to improve the above described deficiencies.

SUMMARY OF THE INVENTION

The disclosure is directed to a detachable scanning and supporting module of a 3D printer, such that the 3D printer can print and scan within a limited space.

The disclosure is directed to a detachable scanning and supporting module of a 3D printer, wherein the scanning and supporting module is detachably combined with the scanning and driving module, such that the scanning and supporting module can be easily detached when not in use.

In one of the exemplary embodiments, a 3D printer of the disclosure comprises a machine body, a printing platform, a scanning and driving module and a scanning and supporting module. The machine body has a bottom plate. The printing platform is disposed on the bottom plate. The printing platform comprises a slide track and a printing substrate. The printing substrate is capable of moving corresponding to the slide track. The scanning and driving module is disposed on the bottom plate. The scanning and driving module and the slide track are staggeredly disposed such that the scanning and driving module and the slide track do not interfere with the movement of the printing substrate. The scanning and supporting module is detachably combined with the scanning and driving module and is driven by the scanning and driving module.

As compared with conventional technique, the scanning and driving module of the disclosure is disposed beneath the XY plane of the printing substrate, such that the scanning and driving module does not interfere the movement of the printing substrate; further, part of the slide track passes through the scanning and driving module along the X-axis, the slide track and the scanning and driving module overlap along the X-axis, such that the scanning and driving module and the printing platform are disposed in the same plane of a limited space. In addition, the scanning and supporting module is detachably combined with the scanning and driving module; thereby, when the scanning and supporting module is not in use, the scanning and supporting module can be easily detached from the scanning and driving module, which further benefits the convenience and utility of the disclosure.

Those and other aspects and associated implementations and features of disclosed wrist exerciser designs are described in greater detail in the drawings, the description and the claims.

BRIEF DESCRIPTION OF THE DRAWINGS

The disclosed wrist exerciser designs will become more fully understood from the detailed description given herein below along with the accompanying drawings which are for illustration only, thus are not limitative of the disclosed wrist exerciser designs.

DETAILED DESCRIPTION

Figure 1:
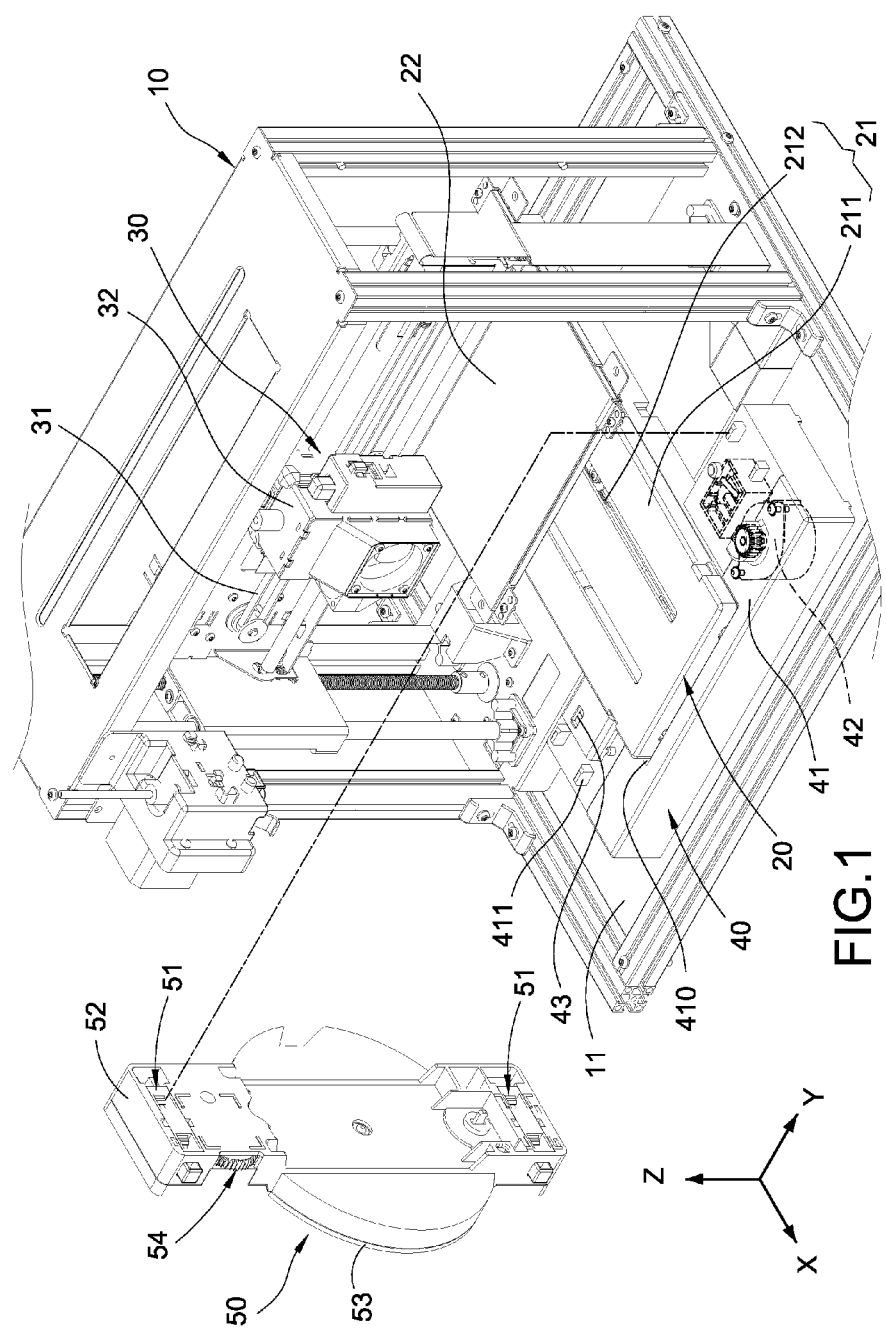
FIG. 1 shows a perspective view of a detachable scanning and supporting module of a 3D printer according to a first embodiment of the disclosure.
Figure 2:
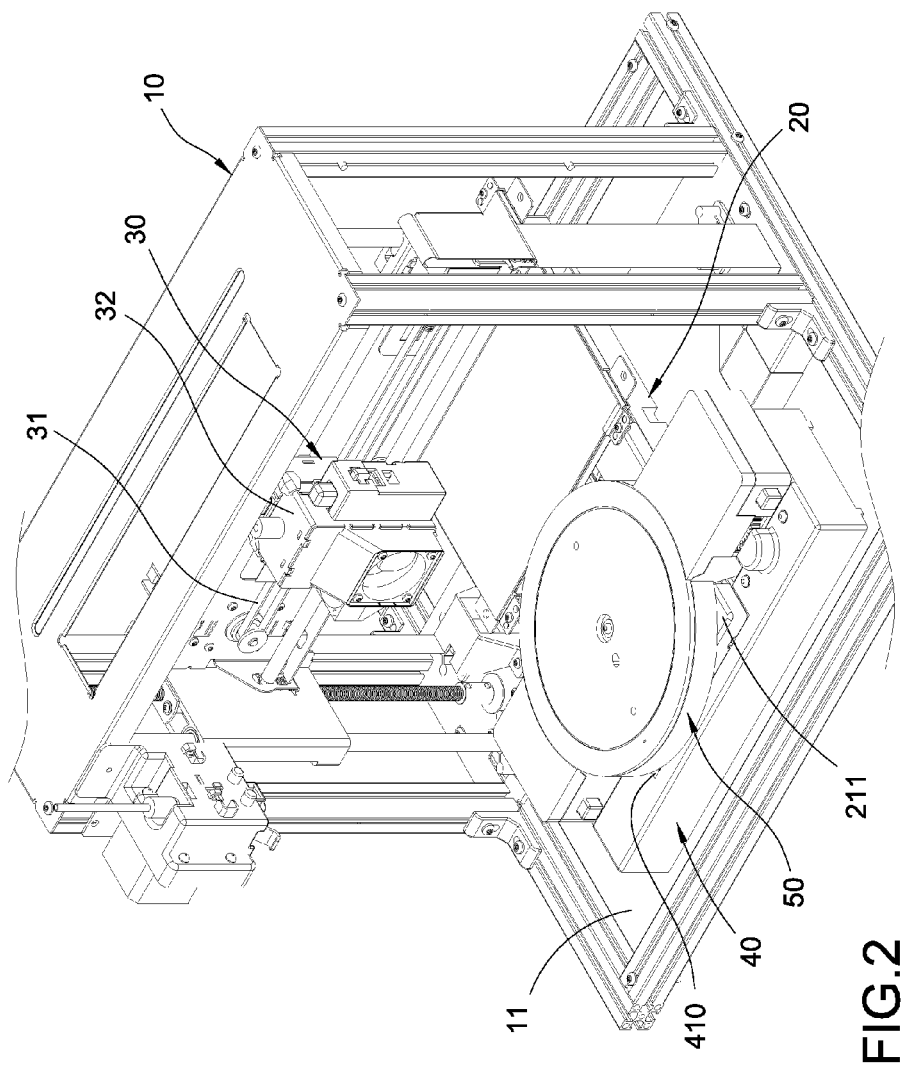
FIG. 2 shows a perspective view of a 3D printer according to the first embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing Referring to FIGS. 1 to 4, which are a perspective view of a detachable scanning and supporting module, a perspective view of a 3D printer and exploded views of a scanning and supporting module of a 3D printer along two directions according to the disclosure. According to the first embodiment of the disclosure, a 3D printer comprises a machine body 10, a printing platform 20, a printing module 30, a scanning and driving module 40 and a scanning and supporting module 50. The printing platform 20, the printing module 30, the scanning and driving module 40 and the scanning and supporting module 50 are disposed inside the machine body 10. Further, the scanning and driving module 40 and the scanning and supporting module 50 are configured for scanning an object, obtaining a 3D information of the object, and inputting a computer graphic software, which is used as an input order in the subsequent processes, so as to control the printing platform 20 and the printing module 30 for printing.

The machine body 10 has a bottom plate 11. The printing platform 20 is disposed above the bottom plate 11. In this embodiment, the printing platform 20 comprises a slide track 21 and a printing substrate 22. The printing substrate 22 is capable of moving corresponding to the slide track 21 along an X-axis. In one embodiment of the disclosure, the slide track 21 comprises a base 211 and a plurality of grooves 212. The printing substrate 22 is movably combined to the plurality of grooves 212.

The printing module 30 is disposed inside the machine body 10, and is capable of moving along two directions of up-and-down and left-and-right. The printing module 30 comprises a printing and driving structure 31 and a printing head 32. The printing head 32 is driven by the printing and driving structure 31 so as to move corresponding to the printing substrate 22 along a Y-axis and a Z-axis.

The scanning and driving module 40 is disposed on the bottom plate 11. The scanning and driving module 40 and the slide track 21 are staggeredly disposed such that they do not interfere with the movement of the printing substrate 22. More specifically, a moving plane is defined when the printing substrate 22 moves on the slide track 21, and the location of the scanning and driving module 40 do not interfere the moving plane. In this embodiment, the scanning and driving module 40 is located beneath the moving plane. Thus, the scanning and driving module 40 and the printing platform 20 are disposed on the same plane in a limited space.

In this embodiment, the scanning and supporting module 50 is disposed above the slide track 21. The scanning and supporting module 50 is detachably combined with the scanning and driving module 40 and is driven by the scanning and driving module 40. During operation, the scanning and supporting module 50 can be disposed at one end of the slide track 21, and the printing substrate 22 is disposed at the other end of the slide track 21. The more detailed structure of the scanning and driving module 40 is described in the followings.

In this embodiment, the scanning and driving module 40 comprises a base 41 and a motor 42, and the motor 42 is disposed inside the base 41. Moreover, part of the slide track 21 passes through the base 41 along the X-axis. Preferably, the base 41 is U-shaped and has a notch 410, and one end of the slide track 21 is located inside the notch 410.

Further, the base 41 of the scanning and driving module 40 has a plurality of latching blocks 411. The scanning and supporting module 50 has a plurality of buckle structures 51, which corresponds to the plurality of latching blocks 411. The scanning and supporting module 50 is combined with the base 41 of the scanning and driving module 40 by the plurality of buckle structures 51 engaging with the plurality of latching blocks 411. According to one embodiment of the disclosure, the base 41 has a plurality of latching blocks 411 at the two sides of the notch 410 respectively, and the two lateral sides of the scanning and supporting module 50 has a buckle structure 51 corresponding to the latching blocks 411.

Figure 3:
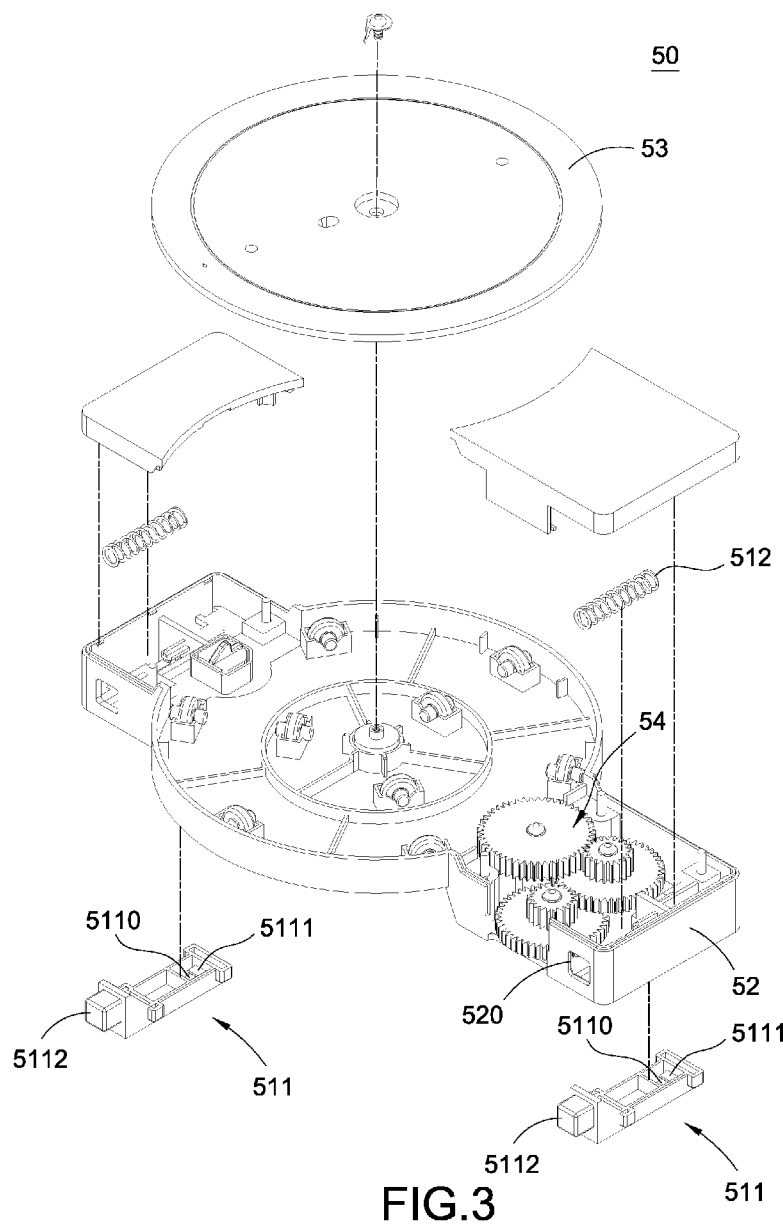
FIG. 3 shows an exploded view of a scanning and supporting module of a 3D printer along one direction according to the first embodiment.
Figure 4:
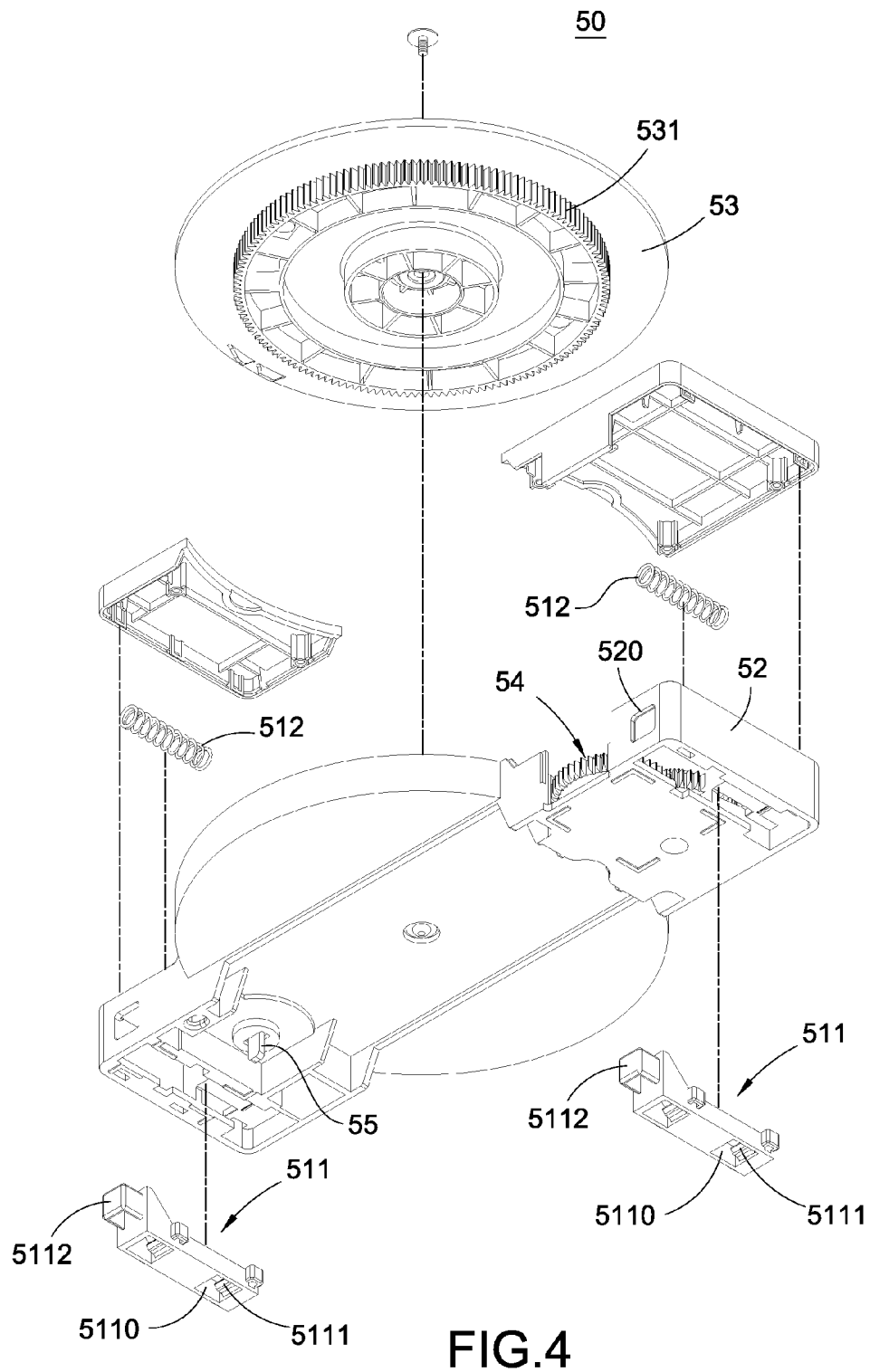
FIG. 4 shows an exploded view of a scanning and supporting module of a 3D printer along another direction according to the first embodiment.

Referring to FIGS. 3 and 4, in this embodiment, each of the buckle structure 51 comprises a pushing member 511 and a spring 512, and the spring 512 elastically abuts the pushing member 511. The pushing member 511 has a plurality of slots 5110 and a plurality of hooks 5111, which is formed in the plurality of slots 510. The pushing member 511 forces the plurality of hooks 5111 engaging with the plurality of latching blocks 411 by the spring 512.

In this embodiment, the scanning and supporting module 50 comprises a carrier platform 52, a rotating disk 53 and a gearset 54. The rotating disk 53 and the gearset 54 are combined with the carrier platform 52; in addition, the pushing member 511 and the spring 512 are disposed inside the carrier platform 52. Preferably, the carrier platform 52 has an opening 520. A push button 5112 is formed at one end of the pushing member 511. When the pushing member 511 is combined with the carrier platform 52, the push button 5112 is exposed via the opening 520.

More specifically, a bottom plane of the rotating disk 53 further comprises a rotating gear 531, and the rotating gear 531 engages with the gearset 54. When the scanning and supporting module 50 is combined with the scanning and driving module 40, the motor 42 drives the gearset 54, the gearset 54 drives the rotating gear 531, which is engaged with the gearset 54, such that the rotating disk 53 rotates. In addition, the scanning and driving module 40 further comprises a sensor 43 disposed at the base 41 (referring to FIG. 1). Correspondingly, the scanning and supporting module 50 further comprises a blocking elastic arm 55. The blocking elastic arm 55 exposes from a bottom plane of the carrier platform 52 so as to block the sensor 43. Thereby, when the blocking elastic arm 55 blocks the sensor 43, it can be realized that the scanning and supporting module 50 rotates for one revolution.

Figure 5:
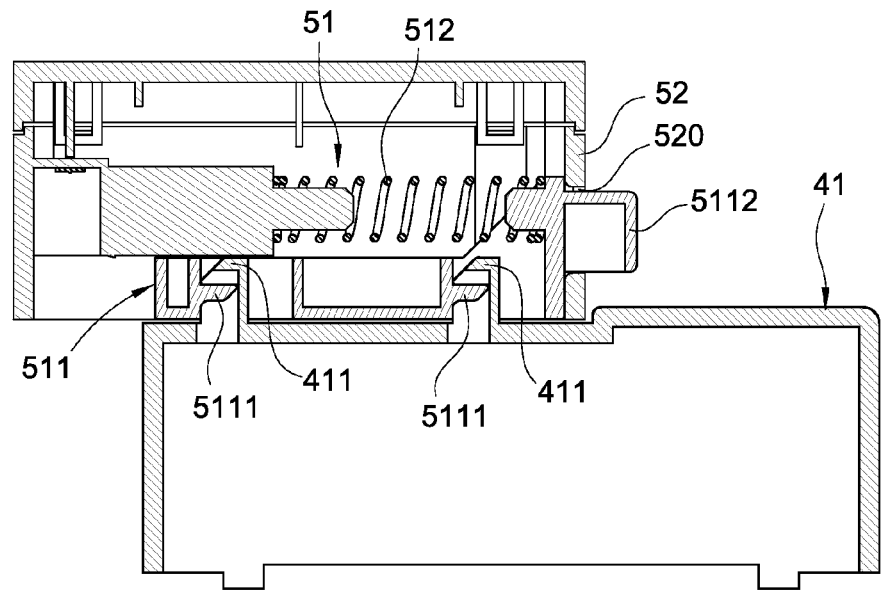
FIG. 5 shows a partial and sectional view of a scanning and supporting module combined with a scanning and driving module according to the first embodiment.
Figure 6:
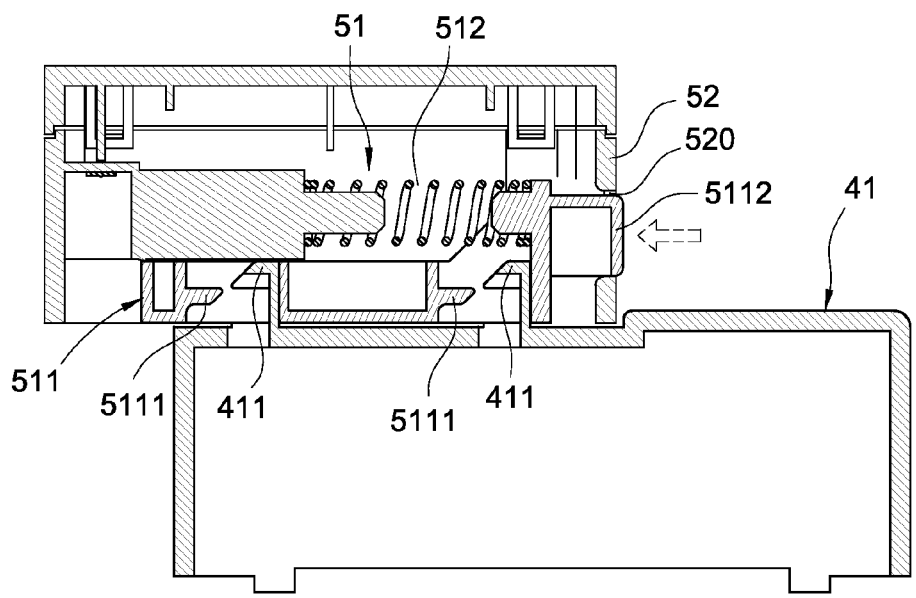
FIG. 6 shows a schematic view of a pushing member when being pressed according to the first embodiment.
Figure 7:
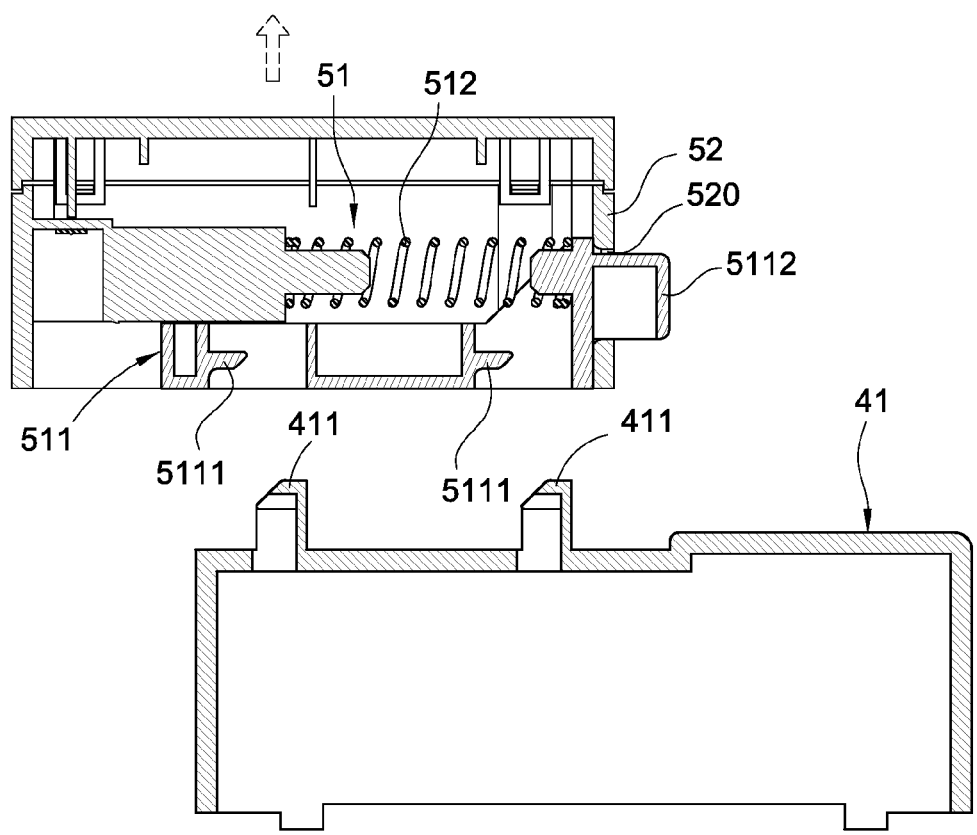
FIG. 7 shows a schematic view of a pushing member after being pressed according to the first embodiment.

Referring to FIGS. 5 to 7, which are a partial and sectional view of the scanning and supporting module combined with the scanning and driving module, a schematic view of a pushing member when being pressed and a schematic view of a pushing member after being pressed according to the disclosure. As shown in FIG. 4, the scanning and supporting module 50 is combined with the base 41 of the scanning and driving module 40 by the plurality of buckle structures 51 engaging with the plurality of latching blocks 411.

Referring to FIG. 5, when the scanning and supporting module 50 is not in use, the scanning and supporting module 50 can be detached from the scanning and driving module 40. For detaching, the push button 5112 of the scanning and supporting module 50 is pressed, and the pushing member 511 is forced to press the spring 512, and the plurality of hooks 5111 is detached from the plurality of latching blocks 411; thus, as shown in FIG. 6, the scanning and supporting module 50 can be easily detached from the scanning and driving module 40.

Figure 8:
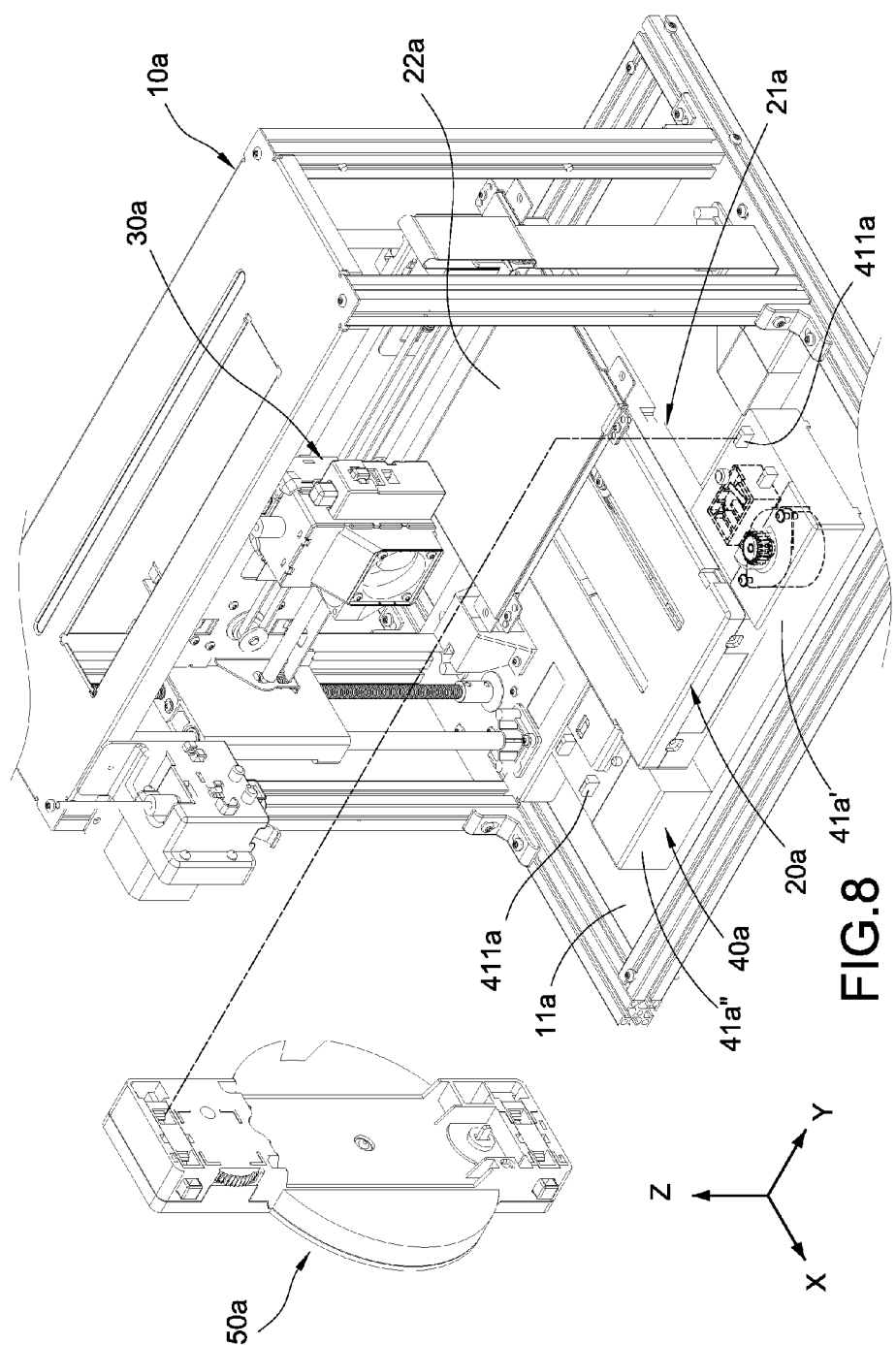
FIG. 8 shows a perspective view of a detachable scanning and supporting module of a 3D printer according to a second embodiment of the disclosure.

Referring to FIG. 8, which is a perspective view of a detachable scanning and supporting module of a 3D printer according to the second embodiment of the disclosure. According to the second embodiment of the disclosure, a a 3D printer comprises a machine body 10a, a printing platform 20a, a printing module 30a, a scanning and driving module 40a and a scanning and supporting module 50a. The printing platform 20a and the scanning and driving module 40a are disposed above a bottom plate 11a of the machine body 10a. The printing platform 20a comprises a slide track 21a and a movable printing substrate 22a. The scanning and driving module 40a and the slide track 21a are staggeredly disposed such that they do not interfere with the movement of the printing substrate 22a. The scanning and supporting module 50a is detachably combined with the scanning and driving module 40a and is driven by the scanning and driving module 40a.

The difference between this embodiment and previous embodiment is how the base 41a of the scanning and driving module 40a is disposed. In this embodiment, the scanning and driving module 40a comprises a first base 41a', a second base 41a" and a motor 42a. The motor 42a is disposed at the first base 41a' (but not limited thereto), and the first base 41a' and the second base 41a" have a plurality of latching blocks 411a. Moreover, one end of the slide track 21a is disposed between the first base 41a' and the second base 41a".

Figure 9:
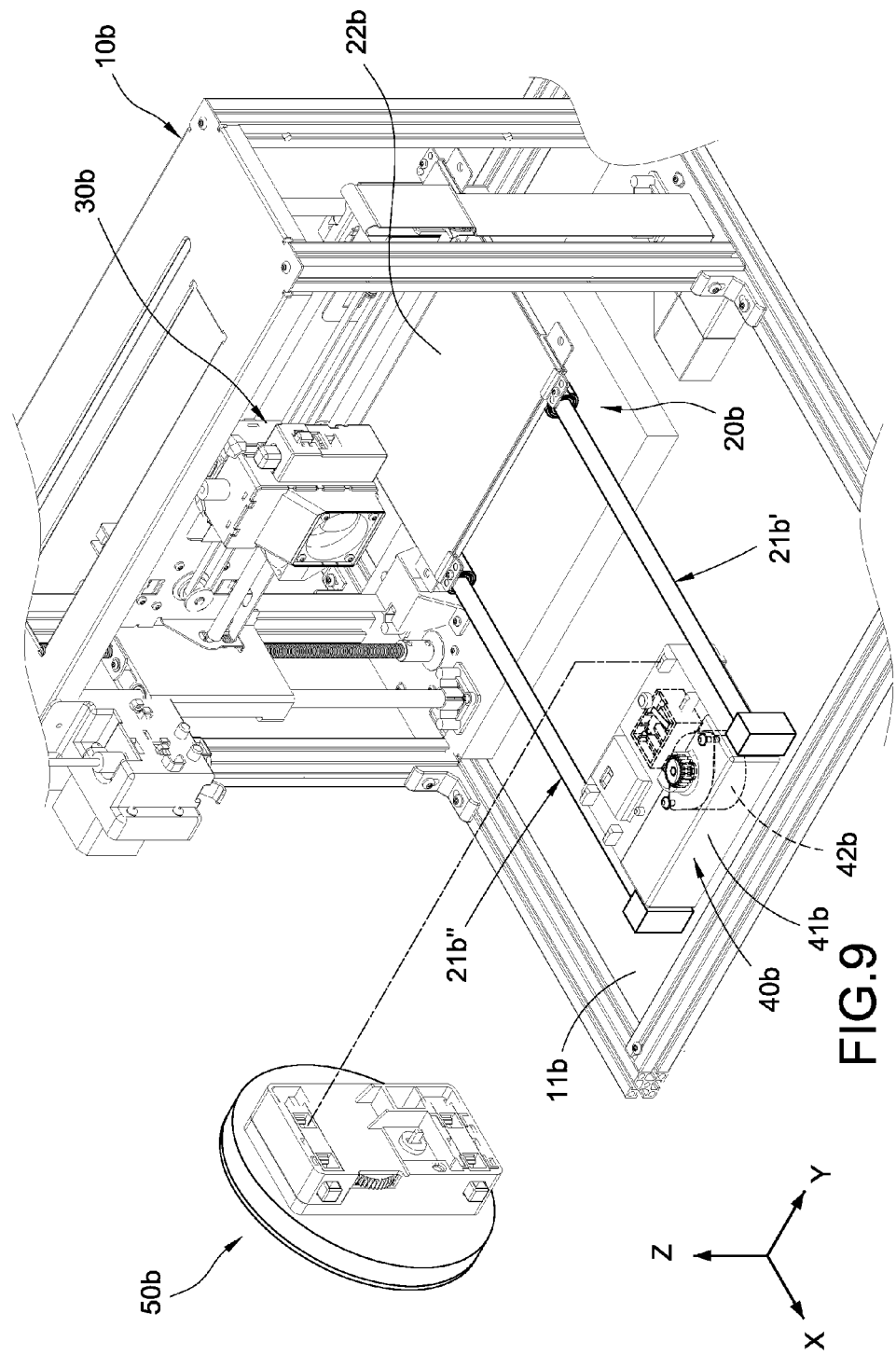
FIG. 9 shows a perspective view of a detachable scanning and supporting module of a 3D printer according to a third embodiment of the disclosure.

Referring to FIG. 9, which is a perspective view of a detachable scanning and supporting module of a 3D printer according to the third embodiment of the disclosure. According to the third embodiment of the disclosure, a 3D printer comprises a machine body 10b, a printing platform 20b, a printing module 30b, a scanning and driving module 40b and a scanning and supporting module 50b. The printing platform 20b and the scanning and driving module 40b are disposed above a bottom plate 11b of the machine body 10b. The printing platform 20b comprises a slide track 21b and a movable printing substrate 22b. The scanning and driving module 40b and the slide track 21b are staggeredly disposed such that they do not interfere with the movement of the printing substrate 22b. The scanning and supporting module 50b is detachably combined with the scanning and driving module 40b and is driven by the scanning and driving module 40b.

The scanning and driving module 40b comprises a base 41b and a motor 42b, and the motor 42b is disposed inside the base 41b. The difference between this embodiment and previous embodiment is how the slide track 21b and the base 41b are disposed. In this embodiment, the slide track 21b comprises a first track 21b' and a second track 21b", the first track 21b' and the second track 21b" are separately disposed; in addition, the base 41b is disposed between the first track 21b' and the second track 21b"; preferably, the base 41b is disposed between one end of the first track 21b' and one end of the second track 21b".

Only a few implementations and examples are described, and other implementations, enhancements and variations can be made based on what is described and illustrated in this patent document.

What is claimed is:

1. A 3D printer, comprising:
   a machine body, having a bottom plate;
   a printing platform, disposed on the bottom plate, the printing platform comprising a slide track and a printing substrate, the printing substrate being capable of moving corresponding to the slide track;
   a scanning and driving module, disposed on the bottom plate, the scanning and driving module and the slide track being staggeredly disposed such that the scanning and driving module and the slide track do not interfere with the movement of the printing substrate; and
   a scanning and supporting module detachably combined with the scanning and driving module, and being driven by the scanning and driving module.

2. The 3D printer according to claim 1, wherein the scanning and supporting module is disposed at one end of the slide track, and the printing substrate is disposed at the other end of the slide track.

3. The 3D printer according to claim 1, wherein the printing substrate is capable of moving corresponding to the slide track along an X-axis.

4. The 3D printer according to claim 3, wherein the scanning and driving module comprises a base and a motor, the motor is disposed inside the base, and part of the slide track passes through the base.

5. The 3D printer according to claim 4, wherein the base is U-shaped and has a notch, and one end of the slide track is located inside the notch.

6. The 3D printer according to claim 4, wherein the base has a plurality of latching blocks, the scanning and supporting module has a plurality of buckle structures, the plurality of latching blocks corresponds to the plurality of buckle structures, and the scanning and supporting module is combined with the base by the plurality of buckle structures engaging with the plurality of latching blocks.

7. The 3D printer according to claim 6, wherein the base has a plurality of latching blocks at the two sides of the notch respectively, and two lateral sides of the scanning and supporting module has a buckle structure corresponding to the latching blocks.

8. The 3D printer according to claim 6, wherein each of the buckle structure comprises a pushing member and a spring, the spring elastically abuts the pushing member, the pushing member has a plurality of slots and a plurality of hooks, the plurality of hooks is formed in the plurality of slots, and the pushing member forces the plurality of hooks engaging with the plurality of latching blocks by the spring.

9. The 3D printer according to claim 8, wherein the scanning and supporting module comprises a carrier platform, a rotating disk and a gearset, the rotating disk and the gearset are combined with the carrier platform, the motor drives the gearset, and the gearset drives the rotating disk to rotate.

10. The 3D printer according to claim 9, wherein the carrier platform has an opening, a push button is formed at one end of the pushing member, and when the pushing member is disposed at the carrier platform, the push button is exposed via the opening.

11. The 3D printer according to claim 9, wherein the scanning and driving module further comprises a sensor disposed at the base, the scanning and supporting module further comprises a blocking elastic arm, and the blocking elastic arm exposes from a bottom plane of the carrier platform so as to block the sensor.

12. The 3D printer according to claim 1, further comprising a printing module, assembled inside the machine body, wherein the printing module comprises a printing and driving structure and a printing head, the printing head is driven by the printing and driving structure so as to move corresponding to the printing substrate along a Y-axis and a Z-axis.

13. The 3D printer according to claim 1, wherein a base of the scanning and driving module comprises a first base and a second base, and one end of the slide track is disposed between the first base and the second base.

14. The 3D printer according to claim 1, wherein the slide track comprises a first track and a second track, the first track and the second track are separately disposed, and the base is disposed between the first track and the second track.

* * * * *